United States Patent [19]

McCord, Jr. et al.

[11] Patent Number: 5,309,962

[45] Date of Patent: May 10, 1994

[54] MULTIPLE SAW BLADE ADJUSTABLE DADO CUTTER ASSEMBLY INCLUDING A CAM ASSEMBLY AND NESTABLE DADO BLADES

[75] Inventors: Wilfred M. McCord, Jr.; David T. Brutscher, both of Louisville, Ky.

[73] Assignee: Vermont American Corporation, Louisville, Ky.

[21] Appl. No.: 58,624

[22] Filed: May 13, 1993

[51] Int. Cl.⁵ .................... B27G 13/00; B27B 33/00
[52] U.S. Cl. ................................. 144/237; 83/664; 83/838; 83/877; 144/222; 144/238; 407/31
[58] Field of Search ............... 83/664, 676, 838, 877; 144/218, 222, 236, 237, 238; 407/31

[56] References Cited

U.S. PATENT DOCUMENTS

| | | | |
|---|---|---|---|
| 486,874 | 11/1892 | Huther | 144/222 |
| 800,143 | 9/1905 | Fox | 144/222 |
| 1,545,293 | 7/1925 | Ware | 144/222 |
| 1,763,463 | 6/1930 | Garthe | 144/222 |
| 2,592,382 | 4/1952 | Blais | 144/237 |
| 2,665,722 | 1/1954 | Edgemond, Jr. | 144/238 |
| 2,788,812 | 4/1957 | Jacobs | 144/237 |
| 2,985,206 | 5/1961 | Letts | 144/238 |
| 4,589,458 | 5/1986 | McCord, Jr. | 144/238 |
| 4,641,562 | 2/1987 | Clarke | 407/31 |

FOREIGN PATENT DOCUMENTS

124643  4/1919  United Kingdom ............... 144/238

Primary Examiner—W. Donald Bray
Attorney, Agent, or Firm—Middleton & Reutlinger

[57] ABSTRACT

A multiple saw blade adjustable dado cutter assembly. The cutter can be used with a table saw or a radial arm saw, for example, to make dado cuts in board lumber. A pair of cooperating cams, each connected to a saw blade, can be adjusted to make a dado cut of a desired width. If the desired dado width is wider than the two blade configuration can cut, a center cam attached to another blade can be inserted between the pair of cooperating cams. With the three blade configuration, the three cams cooperate to allow the three blades to be spaced for the desired width of cut. In both configurations and at any spacing width, the two or three blades employed remain in a generally parallel alignment and transverse to the axis of the arbor on which the assembly is secured. To permit the blades to function with this geometrical relationship and to be adjustable, not all of the blade teeth lie in the same plane. The sequentially operating three or more cam assembly has uses beyond dado cutting. Also, the blades can be made to mount directly onto a saw arbor with spacer washers taking the place of the cam assembly. For industrial applications, more than three blade configurations are envisioned.

12 Claims, 8 Drawing Sheets

MULTIPLE SAW BLADE ADJUSTABLE DADO CUTTER ASSEMBLY INCLUDING A CAM ASSEMBLY AND NESTABLE DADO BLADES

BACKGROUND OF THE INVENTION (a) Field of the Invention

The present invention relates to a multiple saw blade adjustable dado cutter assembly. The cutter can be used with a table saw or a radial arm saw, for example, to make dado cuts in board lumber. A pair of cooperating cams, each connected to a saw blade, can be adjusted to make a dado cut of a desired width. If the desired dado width is wider than the two blade configuration can cut, a center cam attached to another blade can be inserted between the pair of cooperating cams. With the three blade configuration, the three cams cooperate to allow the three blades to be spaced for the desired width of cut. In both configurations and at any spacing width, the two or three blades employed remain in a generally parallel alignment and transverse to the axis of the arbor on which the assembly is secured. To permit the blades to function with this geometrical relationship and to be adjustable, not all of the blade teeth lie in the same plane. The sequentially operating three or more cam assembly has uses beyond dado cutting. Also, the blades can be made to mount directly onto a saw arbor with spacer washers taking the place of the cam assembly. For industrial applications, more than three blade configurations are envisioned.

(b) Description of the Prior Art

A dado, or housed joint, is typically made by cutting a slot into a board, the slot having a depth of cut equal to one half the thickness of the board, the slot being at a location other than the board end, and the slot having a width equal to the thickness of the other board which is to be fitted into the slot. Multiple blade dado cutters which can be adjusted to make cuts of differing width are known in the art. However, they have significant disadvantages when compared to the cutter of the instant invention.

The typical dado cutter for use in the home usually has blades which are adjusted so that a blade rotates in a plane which is not transverse to the axis of the arbor on which the blade is mounted. Basically, with this arrangement, the blade wobbles causing vibration forces and only one saw tooth cuts the outer side edge. For example, this alignment generally requires that the board being cut be fed through the cutter slowly and can cause the dado cut to have rough side edges and an uneven bottom cut. U.S. Pat. No. 4,589,458 teaches a two-bladed adjustable dado cutter employing a cam arrangement which permits the two blades to be adjusted for width of cut. The cam arrangement always keeps the two blades juxtaposed at one location along the blade circumference, with the widest spacing between the blades being at another location diametrically opposed from the juxtaposed location. The blades therefore form a V-shape which permits the wobbling forces to neutralize each other. This particular dado cutter is sold by Sears under the trademark "EXCALIBUR".

Various industrial dado cutters are known in which the blades rotate in planes which are transverse to the axis of the arbor on which the blades are mounted. However, with this configuration, to increase the width of cut, the basic outside two blades must be separated and additional chipper blades and paper shims must be inserted between them. For example, seven different blades may be involved with one dado cutter, the two outside blades which can each cut a width of ⅛ inch or 3.175 mm, four chipper blades which can each cut a width of ⅛ inch or 3.175 mm, and one chipper blade which can cut a width of 1/16 inch or 1.587 mm. By various combinations, this assembly can make dado cuts of from ¼ inch or 6.350 mm to 13/16 inch or 20.637 mm in 1/16 inch or 1.587 mm increments. It should be appreciated that it is expensive to manufacture seven different blades which must function together in a plurality of arrangements.

SUMMARY OF THE INVENTION

The present invention is for a multiple saw blade adjustable dado cutter assembly. The cutter of the preferred embodiment, having the desired two or three blade configuration, is placed onto the arbor of a table saw or a radial arm saw, for example, to make dado cuts in board lumber. The cutter assembly is adjusted for the desired cutting width using the cooperating cams, each connected to one of the saw blade, and the arbor nut is tightened to secure the blades. At any spacing width, the two or three blades employed remain in a generally parallel alignment and transverse to the axis of the arbor on which the assembly is secured. To permit the blades to function with this geometrical relationship and to be adjustable, not all of the blade teeth lie in the same plane.

More specifically, the present invention comprises an adjustable dado cutter mountable onto an arbor, the dado cutter including at least two circular saw blades, each of the blades having an equal diameter, each of the blades having at least one planar saw tooth and at least one off-set saw tooth, each of the blades having at least one circumferential gullet, where the at least two circular saw blades can be nested such that the off-set saw tooth or teeth of one of the circular saw blades can be received by the circumferential gullet or gullets of another of the circular saw blades; and, a cam assembly attached to the at least two circular saw blades, the cam assembly having an axial arbor bore therethrough, the cam assembly being adjustable to space the at least two circular saw blades for a desired dado cutting width, the cam assembly maintaining the at least two saw blades in a parallel relationship transverse to the axial arbor bore.

BRIEF DESCRIPTION OF THE DRAWINGS

A better understanding of the present invention will be had upon reference to the following description in conjunction with the accompanying drawings, wherein.

DETAILED DESCRIPTION OF THE PREFERRED EMBODIMENT

With reference to the figures, the multiple saw blade adjustable dado cutter assembly 10 of the preferred embodiment of the present invention is shown. Cutter assembly 10, in the desired two or three blade configuration, is attached to a saw arbor 2 and secured at the desired cutting width by arbor nut 4. Cutter assembly 10, particularly as seen in FIG. 2, includes a left cam 100 securely attached to a left blade 20, a center cam 200 pivotally attached to a center blade 60, and a right cam 300 pivotally held to a right blade 80 by a right cam retaining ring 360, the right cam retaining ring 360 being securely attached to the right blade 80.

As will be hereinafter explained, the cams 100, 200, 300 have pins and grooves in various cam segments which allow either the left 100 and right 300 cams to cooperate to space the left 20 and right 80 blades to a desired dado cutting width in the two blade configuration or the left 100 and center 200 and right 300 cams to cooperate to space the left 20 and center 60 and right 80 blades to a desired dado cutting width in the three blade configuration. Further, the blades 20, 60, 80 have selected teeth which are off-set or nest in gullets of the adjacent blades, so that the minimum to maximum cutting width of the two or three blade configuration is maximized. It is important to note that for any selected dado cutting width, the blades 20 and 80 (and 60 if in the three blade configuration) remain in a parallel alignment, with each blade lying in a plane transverse to the longitudinal axis of the arbor 2.

Figure 2:
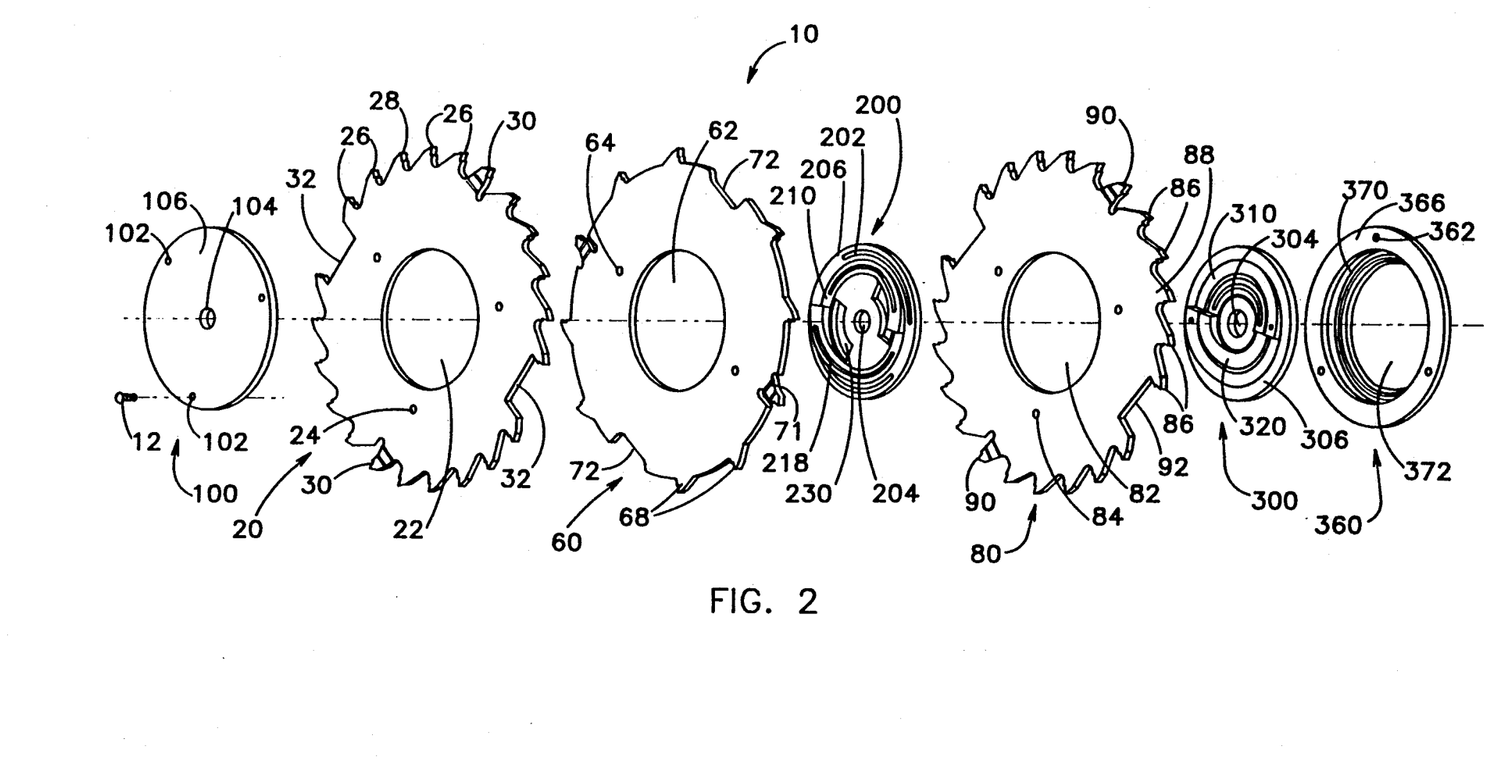
FIG. 2 shows an exploded perspective view of the three-bladed dado cutter assembly of the instant invention.
Figure 3:
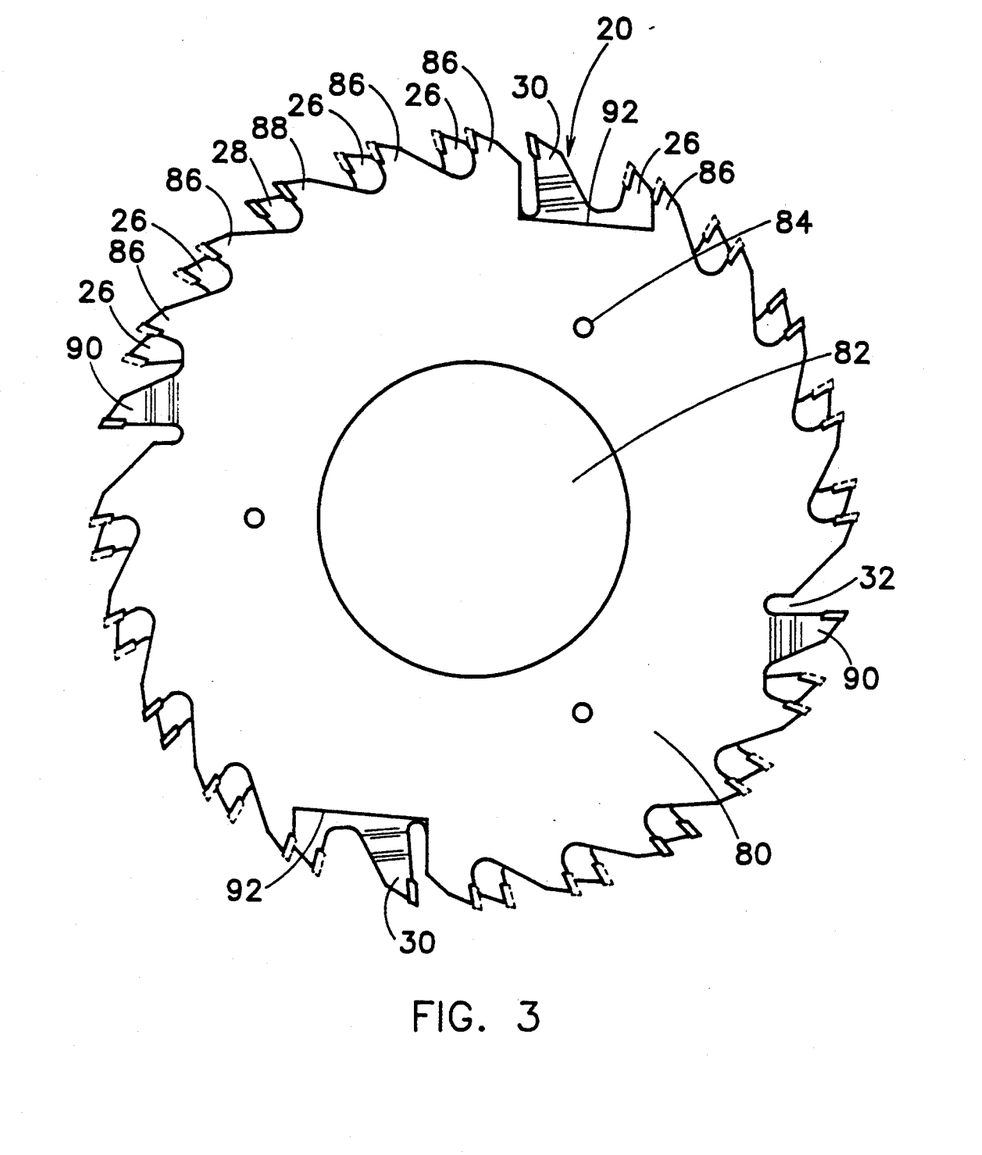
FIG. 3 shows a side view of the right blade having the left blade therebehind.
Figure 4:
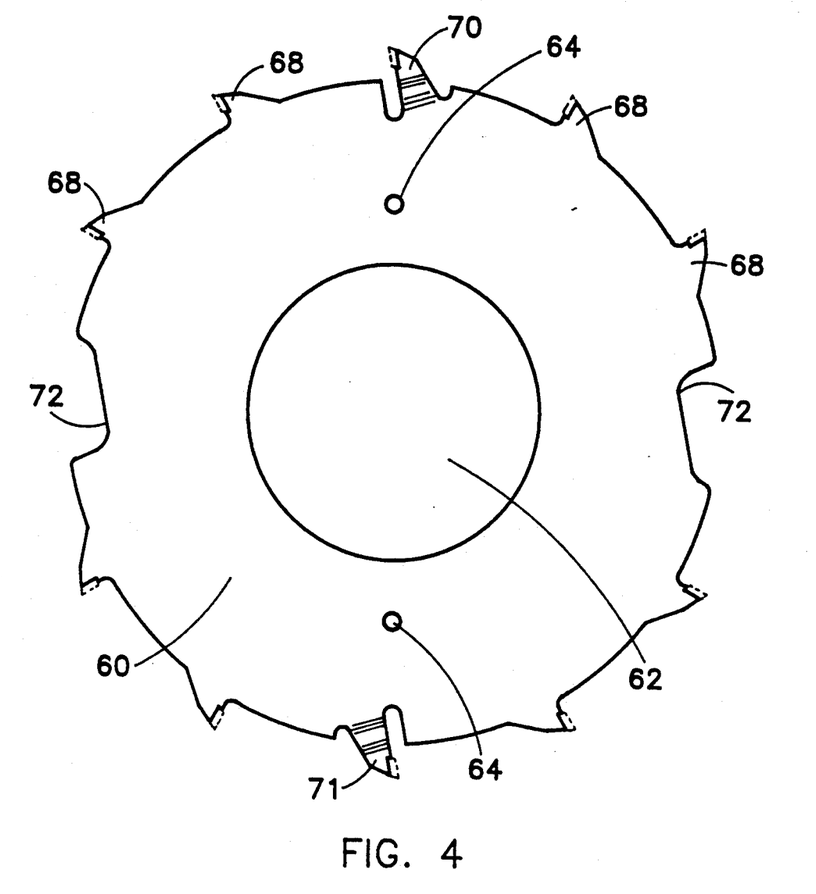
FIG. 4 shows a side view of the center blade.
Figure 5A:
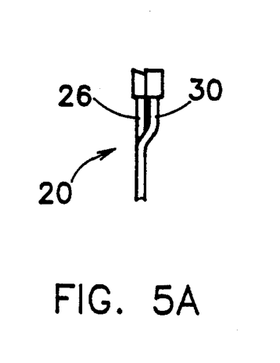
FIGS. 5a–c depict the cutting path that respective rotating left, center, and right blades would make.
Figure 5B:
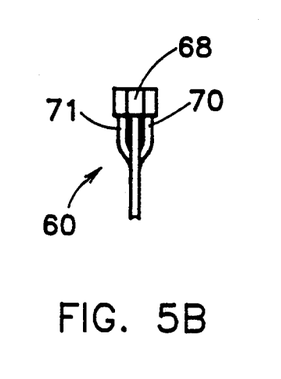
Figure 5C:
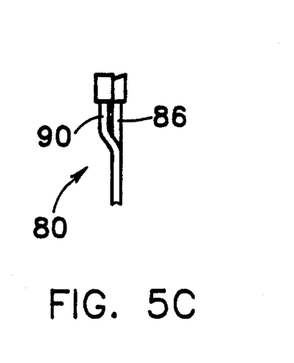
Figure 6:
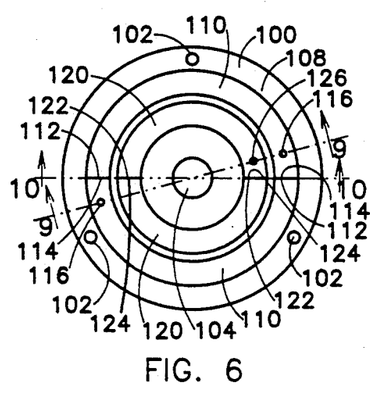
FIG. 6 shows a right face view of the left cam.
Figure 7:
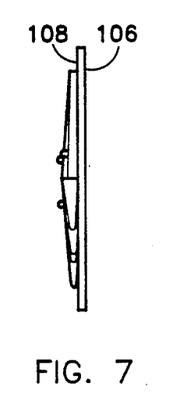
FIG. 7 shows a side view of the left cam.
Figure 8:
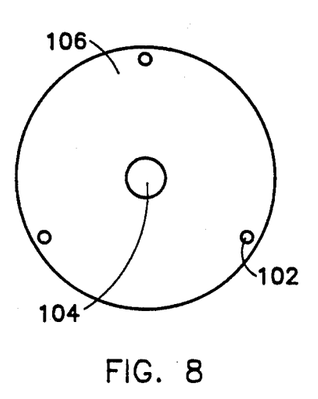
FIG. 8 shows a left face view of the left cam.
Figure 9:
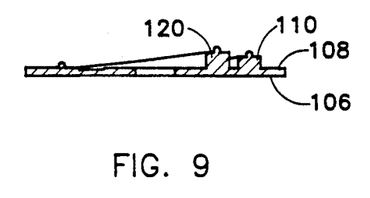
FIG. 9 shows a cross-sectional view of the left cam along the lines 9—9 of FIG. 6.
Figure 10:
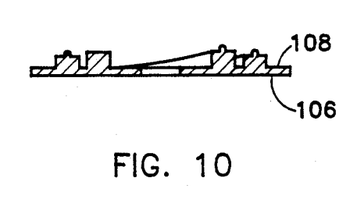
FIG. 10 shows a cross-sectional view of the left cam along the lines 10—10 of FIG. 6.

The exploded perspective view of the three blade assembly is shown in FIG. 2, with the blades being shown in more detail in FIGS. 3-5 and the cams and retaining ring being shown in more detail in FIGS. 6-23. While the blades can be configured with many different cutting teeth arrangements, the two blade, 20 and 80, arrangement is designed to cut from a minimum dado width of ¼ inch or 6.350 mm to a maximum dado width of ½ inch or 12.700 mm. This is possible because first, even though each blade 20 and 80 has an individual cutting width of ¼ inch or 6.350 mm, the two blades 20 and 80 nest, so that, when placed closest together, their combined teeth only have a cutting width of ¼ inch or 6.350 mm and second, when placed furthest apart, the two ¼ inch or 6.350 mm wide blades permit a ½ inch or 12.700 mm dado cut. A similar arrangement exists with the three blade arrangement. The left and right blades, 20 and 80, each have a cutting width of ¼ inch or 6.350 mm and the center blade 60 has a cutting width of 5/16 inch or 7.937 mm. The left and right blades 20 and 80 nest into the center blade 60, so that, when placed closest together, their combined teeth only have a cutting width of ½ inch or 12.700 mm and, when placed furthest apart, the two ¼ inch or 6.350 mm wide blades 20 and 80 and the 5/16 inch or 7.937 mm wide blade 60 permit a 13/16 inch or 20.637 mm dado cut. This is the actual thickness of a "one inch" board. It is also important to note that, with the three blade configuration set to the maximum dado cutting width of 13/16 inch or 20.637 mm, the total width of the cams and blades which must be received by the arbor 2 is less than or equal to ⅞ inch or 22.225 mm. This permits the assembly 10 to be used on most commercially available table and radial arm saws, as keeping this dimension to less than or equal to ⅞ inch or 22.225 mm allows the arbor nut 4 to be fully threaded onto the arbor 2 to permit safe saw operation.

Figure 24:
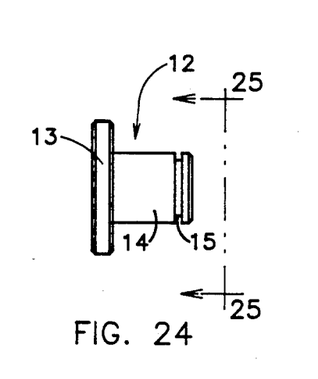
FIG. 24 shows a side view of a pin used to attach a cam and a blade.
Figure 25:
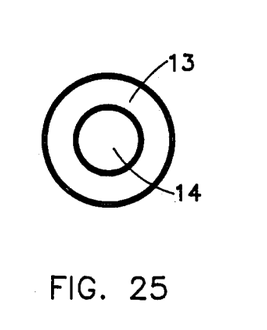
FIG. 25 shows an end view of the pin along the lines 25—25 of FIG. 24.

Left blade 20 has a center bore 22 which receives a portion of left cam 100. Cam bores 24 in blade 20 and bores 102 in left cam 100 align. For example, a pin 12 having a head 13 and a shaft 14, the shaft 14 having a shaft circumferential groove 15 therearound, as seen in FIGS. 24 and 25, can be inserted through a bore 24 and a bore 102 and an E-ring (not shown) can be inserted into groove 15 to secure left blade 20 and left cam 100.

As shown, left blade 20 has four sets of five saw teeth which lie in the same plane with the blade 20 and two teeth which are off-set from the blade plane. The planar center tooth 28 of each of the sets of five teeth is ground to a flat top, transverse to the plane of the blade. The two planar teeth 26 on either side of planar center tooth 28 are scoring teeth. They are ground with a left to right slope or bevel so that they cut deeper at the location furthest from the right blade 80. This aids in making the sides of the dado cut smoother, as it helps ensure cutting rather than tearing and thus splintering of the wood fibers, as the dado cut is usually made cross-grain.

Diametrically opposed and between two of the sets of five teeth 26 and 28 are two right off-set teeth 30, each having a flat top like teeth 28, the flat top also being transverse to the plane of the blade such that the teeth 28 and the teeth 30 will cut the same depth. Diametrically opposed and ninety degrees from the two right off-set teeth 30 are a pair of gullets 32 for receiving the left off-set tooth 71 of the center blade 60 or the two left off-set teeth 90 of the right blade 80, depending on whether the three or two-blade configuration is employed.

Likewise, right blade includes a center bore 82 which receives a portion of right cam 300. In contrast to the secure connectivity of left blade 20 and left cam 100, right cam 300 is pivotally contained by right blade 80 and a right cam retaining ring 360, right cam retaining ring 360 having a left face 366 and a right face 368. Ring bores 84 in blade 80 and bores 362 in right cam retaining ring 360 align with the right cam 300 being received in a right cam recess 370 of right cam retaining ring 360. As with left blade 20/left cam 100 connectivity, for example, these bores 84 and 362 can have pins 12 inserted therethrough, with an E-ring inserted into each pin 12 groove 15 to secure right blade 80 and right cam retaining ring 360.

As shown, the teeth of right blade 80 are in a similar pattern to the teeth of left blade 20, except the two off-set teeth off-set to the left and the bevel on the scoring teeth is from right to left. Right blade 80 has four sets of five saw teeth which lie in the same plane with the blade 80 and two teeth which are off-set from the blade plane. The planar center tooth 88 of each of the sets of five teeth is ground to a flat top, transverse to the plane of the blade. The two planar teeth 86 on either side of planar center tooth 88 are scoring teeth. They are ground with a right to left slope or bevel so that they cut deeper at the location furthest from the left blade 20. This aids in making the sides of the dado cut smoother, as it helps ensure cutting rather than tearing and thus splintering of the wood fibers, as the dado cut is usually made cross-grain.

Diametrically opposed and between two of the sets of five teeth 86 and 88 are two left off-set teeth 90, each having a flat top like teeth 88, the flat top also being transverse to the plane of the blade such that the teeth 88 and the teeth 90 will cut the same depth. Diametrically opposed and ninety degrees from the two left off-set teeth 90 are a pair of gullets 92 for receiving the right off-set tooth 70 of the center blade 60 or the two right off-set teeth 30 of the left blade 20, depending on whether the three or two-blade configuration is employed.

FIG. 3 shows a right side view of the right blade 80 with the left blade 20 therebehind in the two-blade configuration. It is seen that in the two-blade configuration, the right blade 80 left off-set teeth 90 are spaced very approximately about ninety degrees from the left blade 20 right off-set teeth 30, the offset teeth 90 and 30 being received by gullets 32 and 92, respectively. When viewed from the side, as in FIG. 3, the teeth 86/88 of blade 80 are not in alignment with the teeth 26/28 of blade 20. For example, when looking at the top portion of FIG. 3, blade 80 has two of its teeth 86 to the left of the top gullet 92. A tooth 26 of blade 20, behind blade 80, lies approximately midway between the two identified teeth 86. As seen, similar relationships exist with the other blade 80/20 teeth. This is necessary to permit full nesting of the left and right blades, as, in the preferred embodiment, the saw cutting teeth are wider than the saw blades to which they are attached.

Center blade 60 has a center bore 62 which receives a portion of center cam 200. A pair of diametrically opposed cam bores 64 in blade 60 and grooves 202 in center cam 200 align, so that center cam 200 can be pivotally attached to center blade 60. For example, bores 64 and grooves 202 can have pins 12, previously described, inserted therethrough and an E-ring inserted into each pin 12 groove 15 to pivotally secure center blade 60 and center cam 200.

As shown in FIGS. 2 and 4, center blade 60 has two sets of five saw teeth having diametrically opposed gullets 72 therebetween. Eight of the ten teeth, identified by the numeral 68, lie in the same plane with the blade 60 and two of the ten teeth are off-set from the blade plane, one to the left and one to the right. The right and left off-set teeth are diametrically opposed and identified by the numerals 70 and 71, respectively. All ten teeth are ground to a flat top, transverse to the plane of the blade.

Figure 1:
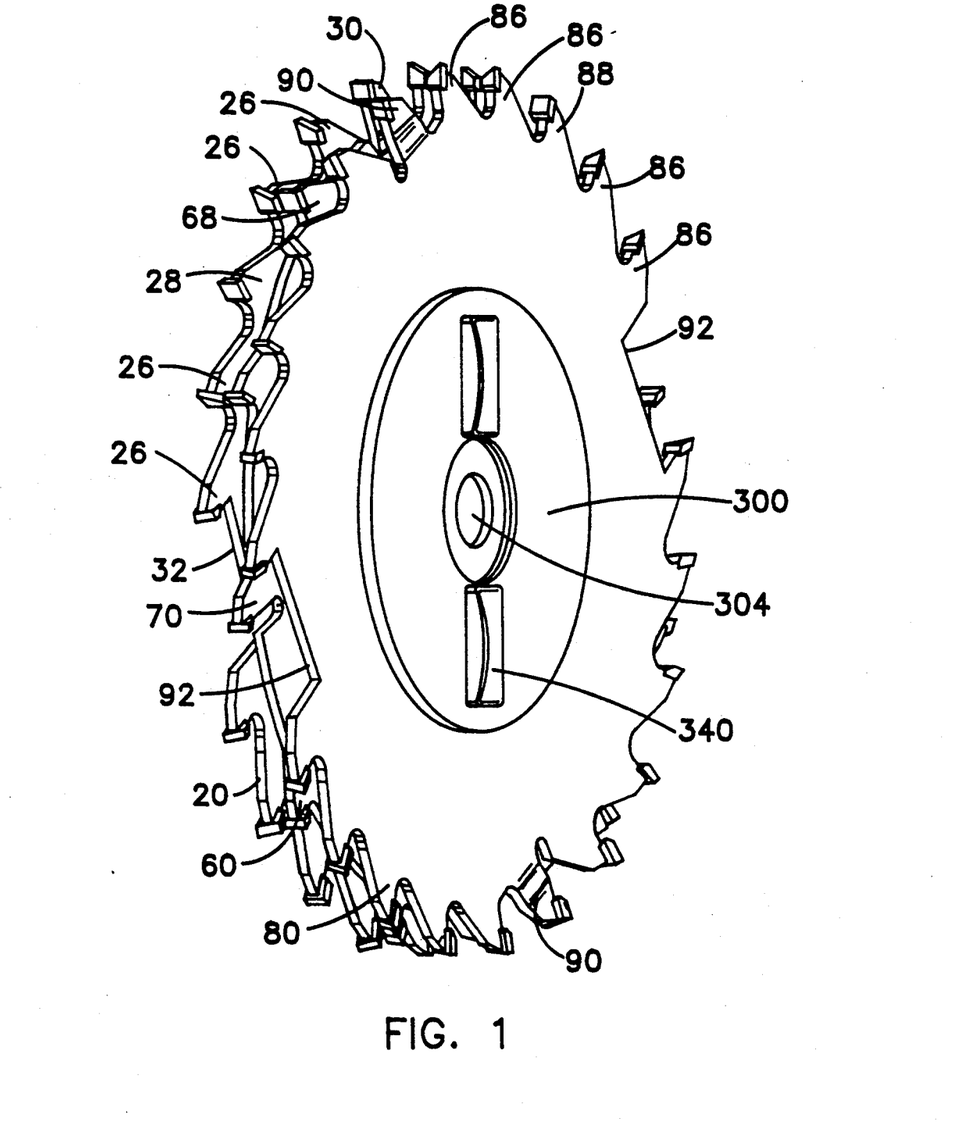
FIG. 1 shows a perspective view of the three-bladed dado cutter assembly of the instant invention without the right cam retaining ring.

When the center blade 60 is employed in the three-blade configuration between left blade 20 and right blade 80 and the three-blade configuration is adjusted for minimum dado width, it can be seen from FIGS. 1 and 2 that each of the gullets 72 receives both a right off-set tooth 30 from left blade 20 and a left off-set tooth 90 from right blade 80. Therefore, gullets 72 are sized larger than gullets 32 and 92. One of the gullets 32 of left blade 20 receives the left off-set tooth 71 of center blade 60 and one of the gullets 92 of right blade 80 receives the right off-set tooth 70 of center blade 60.

FIGS. 5a-c depict the cutting paths that the respective left 20, center 60, and right 80 blades would make if the blades were rotated at least one revolution. To depict these cutting paths, these figures have been drawn to show the planar teeth and the off-set teeth in a side by side arrangement. The actual teeth arrangement and the blade nesting have been previously described and shown in FIGS. 1-4.

FIGS. 2 and 6-23 show the cooperating cams 100, 200, 300 and right cam retaining ring 360. FIGS. 6-10 show the left cam 100 in detail. Left cam 100 has a left face 106 and a right face 108. Central to left cam 100 is an arbor bore 104. Three left blade bores 102 are toward the circumference of cam 100. Bores 102 are equally spaced from each other and are equidistant from arbor bore 104. Bores 102 are used to attach cam 100 and left blade 20, as was previously explained.

Left face 106 is basically flat. Right face 108 has a pair of outer cam segments 110 and a pair of inner cam segments 120. Segments 110 form a circular pattern, as do segments 120. These circles are concentric having arbor bore 104 at their center. The two outer cam segments 110 have diametrically opposed low points 112 and diametrically opposed high points 114. The low point 112 of one cam segment 110 is adjacent the high point 114 of the other cam segment 110. The two inner cam segments 120 have diametrically opposed low points 122 and diametrically opposed high points 124. The low point 122 of one cam segment 120 is adjacent the high point 124 of the other cam segment 120. Low points 112 and 122 lie in the same plane with right face 108. The cam segments 110 and 120 have a linear rise from their respective low points 112 and 122 to their respective high points 114 and 124. The high points 124 of inner cam segments 120 are "higher" (further from the plane of right face 108) (0.223 inch or 5.664 mm) than the high points 114 of outer cam segments 110 (0.167 inch or 4.242 mm). A pair of diametrically opposed pins 116 extend from cam segments 110 and are positioned toward said high points 114, shown in FIG. 6 to be on radii 11.5 degrees from radii drawn to high points 114. One of inner cam segments 120 contains a pin 126, pin 126 being in alignment with pins 116. Depending on whether the three or two-blade configuration is selected, as outer cam segments 110 function in the three-blade configuration and cooperate with the center cam 200 and inner cam segments 120 function in the two-blade configuration and cooperate with the right cam 300, respective pins 116 or pin 126 engage respective grooves 218 of center cam 200 or groove 328 of right cam 300, as is explained hereinafter.

Right cam 300 has similar geometry to left cam 100, and is shown in detail in FIGS. 15-19. The right cam retaining ring 360 used to pivotally secure right cam 300 and right blade 80 is shown in detail in FIGS. 20-23. This connectivity has been previously explained. Right cam 300 has a left face 306 and a right face 308. Central to right cam 300 is an arbor bore 304. Central to right cam retaining ring 360 is a comparatively large cam adjustment means bore 372.

Right cam 300 right face 306 is basically flat, having cam adjustment means 340 extending transverse therefrom. As shown, cam adjustment means 340 comprises a pair of diametrically opposed adjusters which a user can engage to rotate right cam 300 with respect to the other cams 100 and 200. Left face 306 has a pair of outer cam segments 310 and a pair of inner cam segments 320. Segments 310 form a circular pattern, as do segments 320. These circles are concentric having arbor bore 304 at their center. The two outer cam segments 310 have diametrically opposed low points 312 and diametrically opposed high points 314. The low point 312 of one cam segment 310 is adjacent the high point 314 of the other cam segment 310. The two inner cam segments 320 have diametrically opposed low points 322 and diametrically opposed high points 324. The low point 322 of one cam segment 320 is adjacent the high point 324 of the other cam segment 320. Low points 312 and 322 lie in the same plane with left face 306. The cam segments 310 and 320 have a linear rise from their respective low points 312 and 322 to their respective high points 314 and 324. The high points 324 of inner cam segments 320 are "higher" (further from the plane of left face 306) (0.223 inch or 5.664 mm) than the high points 314 of outer cam segments 310 (0.197 inch or 5.004 mm). A pair of diametrically opposed pins 316 extend from cam segments 310 toward said high points 314, shown in FIG. 15 to be on radii 11.5 degrees from radii to high points 314. One of inner cam segments 320 contains a radial groove 328, radial groove 328 having an arc of about 160 degrees. In the two-blade configuration, pin 126 of left cam 100 is inserted into radial groove 328 and the inner cam segments 120 and 320 abut. Rotating cam adjustment means 340 such that pin 126 moves from one end of groove 328 to the other end of groove 328 moves blades 20 and 80 in a parallel relationship from their minimum to maximum spacing therebetween. Outer cam segments 110 and 310 do not function in the two-blade configuration.

Figure 11:
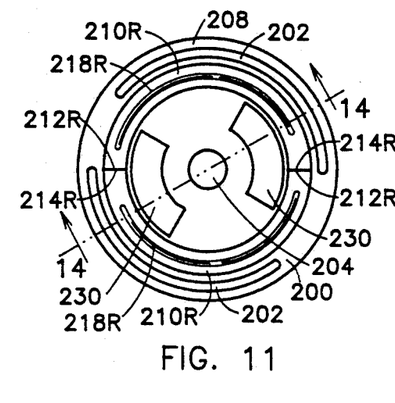
FIG. 11 shows a right face view of the center cam.
Figure 12:
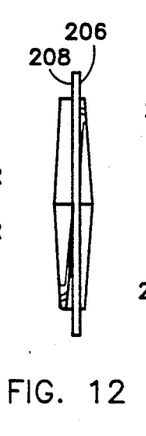
FIG. 12 shows a side view of the center cam.
Figure 13:
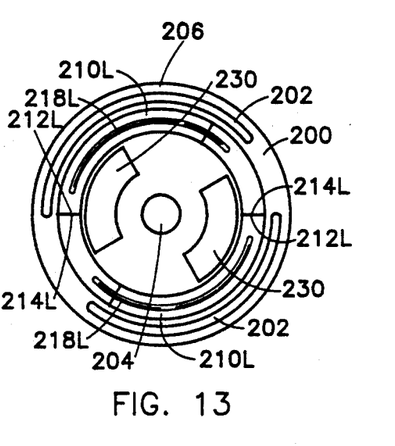
FIG. 13 shows a left face view of the center cam.
Figure 14:
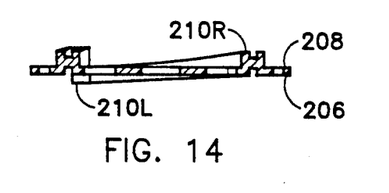
FIG. 14 shows a cross-sectional view of the center cam along the lines 14—14 of FIG. 11.
Figure 15:
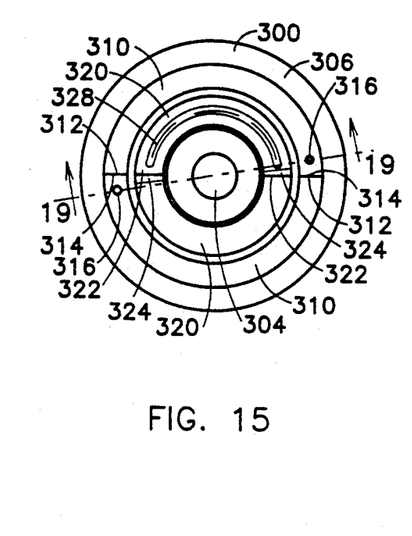
FIG. 15 shows a left face view of the right cam.
Figure 16:
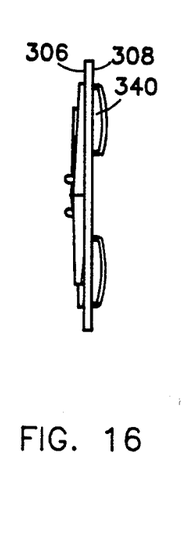
FIG. 16 shows a side view of the right cam.
Figure 17:
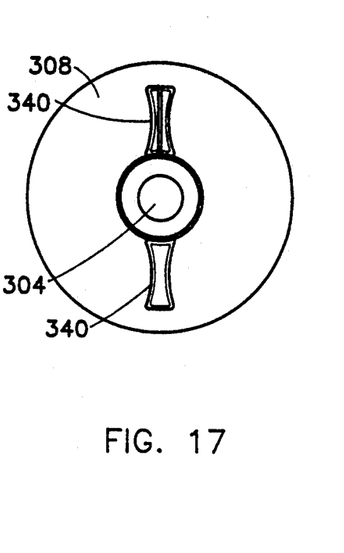
FIG. 17 shows a right face view of the right cam.
Figure 18:
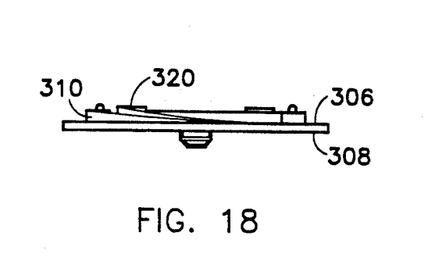
FIG. 18 shows a side view of the right cam, the view being ninety degrees from the side view of FIG. 16.
Figure 19:
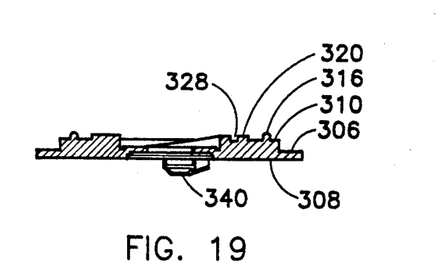
FIG. 19 shows a cross-sectional view of the right cam along the lines 19—19 of FIG. 15.
Figures 20, 21:
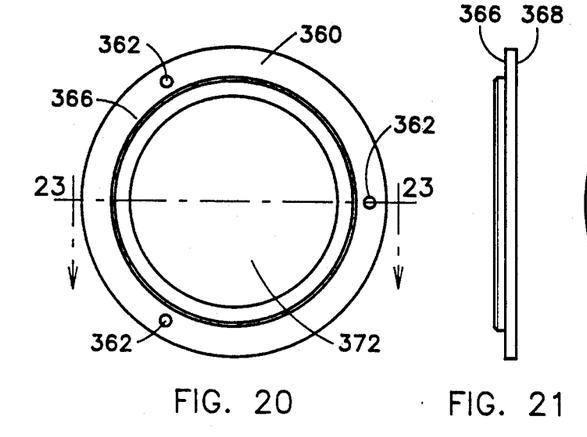
FIG. 20 shows a left face view of the right cam retainer.
FIG. 21 shows a side view of the right cam retainer.
Figure 22:
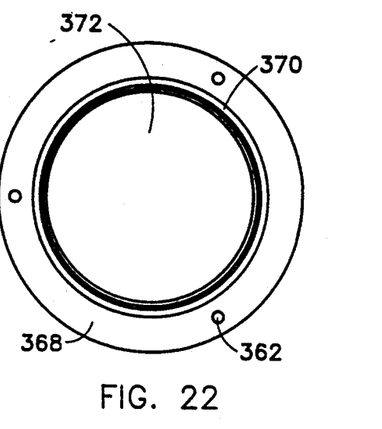
FIG. 22 shows a right face view of the right cam retainer.
Figure 23:
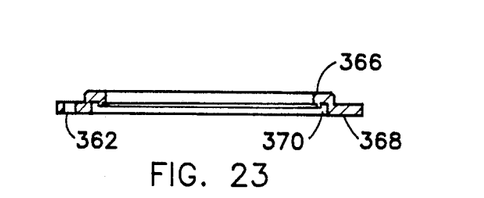
FIG. 23 shows a cross-sectional view of the right cam retainer along the lines 23—23 of FIG. 11.

Center cam 200 is shown in detail in FIGS. 11-14, with FIG. 11 showing the right face 208 having outer cam segments 210R which engages right cam 300 outer cam segments 310 and FIG. 13 showing the left face 306 having outer cam segments 210L which engages left cam 100 outer cam segments 110. Central to center cam 200 is an arbor bore 204. Three left blade bores 102 are toward the circumference of cam 100. A pair of center blade grooves 202 are equidistant from arbor bore 204 and toward the outer circumference of center cam 200. Grooves 202 are used to attach cam 200 and center blade 60, for example, by inserting pins 12 into center blade 60 cam bores 64 and grooves 202 and attaching an E-ring to each pin 12 shaft groove 15, as was previously explained with respect to attaching left blade 20 to left cam 100 and to attaching right blade 80 to right cam retaining ring 360.

Right face 208 has a pair of outer cam segments 210R and left face 206 has a pair of outer cam segments 210L. Segments 210R form a circular pattern, as do segments 210L. These circles are concentric having arbor bore 204 at their center. The two outer cam segments 210R have diametrically opposed low points 212R and diametrically opposed high points 214R. The low point 212R of one cam segment 210R is adjacent the high point 214R of the other cam segment 210R. The same structure applies to segments 210L, as the two outer cam segments 210L have diametrically opposed low points 212L and diametrically opposed high points 214L. The low point 212L of one cam segment 210L is adjacent the high point 214L of the other cam segment 210L. As with the left 100 and right 300 cams, low points 212R and 212L lie in the same plane with right face 208 and left face 206, respectively. Further, the cam segments 210R and 210L have a linear rise from their respective low points 212R and 212L to their respective high points 214R and 214L.

Many geometric relationships are possible to permit parallel movement of the blades 20 and 80, and possibly 60. As shown, the high point 214R is further from respective right face 208 (0.270 inch or 6.858 mm) than high point 214L is from respective left face 206 (0.150 inch or 3.810 mm). The relationships described herein, which permit linear adjustment of the blades, are those of the preferred embodiment and are not limiting the scope of the invention.

Between segments 210L and 210R and arbor bore 204 and concentric therewith are a pair of inner cam segment receiving slots 230. As was previously mentioned, the inner cam segments 120 and 320 of left 100 and right 300 cams have respective high points 124 and 324 which are "higher" that the respective high points 114 and 314 of the respective outer cam segments 110 and 310. Slots 230 are sized to receive the "highest" portions of inner cam segments 120 and 320 of respective cams 100 and 300 so that in the three-blade configuration the blades 20, 60, and 80 can come closer together than if slots 230 were not present.

As previously mentioned, it is the cooperation of the outer cam segments 110/210L and 210R/310 which control the three-blade configuration spacing. The pair of diametrically opposed pins 116 extending from cam segments 110 of left cam 100 engage pin grooves 218L in outer cam segments 210L of center cam 200. Likewise, the pair of diametrically opposed pins 316 extending from cam segments 310 of right cam 300 engage pin grooves 218R in outer cam segments 210R of center cam 200. In this preferred three-bladed embodiment, to move the blades 20, 60, 80 from their closest parallel spacing to their furthest parallel spacing, pins 116 move approximately 130 degrees in grooves 218L and pins 316 move approximately 150 degrees. Again, many geometric relationships will permit the blades 20, 60, 80 to be spaced for the desired dado cutting width.

With the three-bladed preferred embodiment shown, to move the blades 20, 60, 80 from their closest to their furthest parallel alignments, the cams provide a sequential movement. First, turning cam adjustment means 340 on right cam 300 causes the right blade 80 to move away from the center blade 60. When pins 316 reach the ends of pin grooves 218R, additional turning of cam adjustment means 340 on right cam 300 causes the right blade 80 and the center blade 60 to move away from the left blade 20. When moving blades 20, 60, 80 from their furthest to closest position, cam adjustment means 340 is turned in the opposite direction. In this situation, the right blade 80 moves toward the center blade 60 until pins 316 reach the other ends of pin grooves 218R. Additional turning then causes right 80 and center 60 blades to move toward the left blade 20. When the blades 20, 60, 80 are spaced to the desired dado cutting width, tightening arbor nut 4 onto arbor 2 provides pressure onto cams 100, 200, 300 to keep them in their desired spaced relationship. It is also envisioned that this sequential cam operation has uses beyond those described herein. Employing the cam concepts taught herein, a three, or more, cam arrangement can be provided for any application in which one item must be first moved away from a second item a desired distance and then the first and second items are together moved away from a third item, and so forth.

While not specifically shown in the drawings, two additional embodiments deserve mention. The blades 20 and 80 and possibly 60 can have their respective center bores 22, 82, 62 resized to fit a saw arbor rather than receive respective cams 100, 300, 200. The three, or more, blades 20, 60, 80 could then be sold with some washer-type spacers. A user could place blade 20 onto a arbor 2, insert an appropriate number of spacer washers, add either center blade 60 with more spacers and right blade 80 or right blade 80 to set the desired dado cutting width. The user would then secure the blades and spacers with arbor nut 4.

As was previously mentioned, the cams 100, 200, 300 of the preferred embodiment have a maximum total width to be received by the arbor 2 of ⅞ inch or 22.225 mm which permits the assembly 10 to be used on most commercially available table and radial arm saws, as keeping this dimension to less than or equal to ⅞ inch or 22.225 mm allows the arbor nut 4 to be fully threaded onto the arbor 2 to permit safe saw operation. However, there are industrial saws available which have "longer" arbors and will, therefore, receive a blade/cam arrangement having a width exceeding ⅞ inch or 22.225 mm. It is therefore envisioned that more than three blade 20, 60, 80 configurations are possible within the scope of the present invention as already disclosed. For example, a four blade configuration is easily envisioned employing left blade 20 with left cam 100, right blade 80 with right cam 300, and a pair of center blades 60 with a pair of center cams 200. The geometry of the cam segments on the right face of the left center cam and the left face of the right center cam would be altered to allow these cam segments to cooperate. Additionally, to set the limits of movement, pins would be placed into the cam segments of either the right face of the left center cam or the left face of the right center cam to mate with the opposed cam segment grooves.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. An adjustable dado cutter mountable onto an arbor, the dado cutter comprising:
   a. at least two circular saw blades, each of said blades having an equal diameter, each of said blades having at least one planar saw tooth and at least one off-set saw tooth, each of said blades having at least one circumferential gullet, where said at least two circular saw blades can be nested such that said at least one off-set saw tooth of one of said at least two circular saw blades can be received by said at least one circumferential gullet of another of said at least two circular saw blades; and,
   b. a cam assembly attached to said at least two circular saw blades, said cam assembly having an axial arbor bore therethrough, said cam assembly being adjustable to space said at least two circular saw blades for a desired dado cutting width, said cam assembly maintaining said at least two saw blades in a parallel relationship transverse to said axial arbor bore.

2. The adjustable dado cutter of claim 1, where the cam assembly is linearly adjustable to permit said at least two saw blades to be spaced to make a dado cut of any desired width, said desired width being between a minimum width and a maximum width.

3. A nestable saw blade assembly mountable onto an arbor, the assembly comprising:
   a. at least two circular saw blades, each of said blades having an axial arbor bore therethrough for mounting said blade onto an arbor, each of said blades having an equal diameter, each of said blades having at least one planar saw tooth and at least one off-set saw tooth, each of said blades having at least one circumferential gullet, where said at least two circular saw blades can be nested such that said at least one off-set saw tooth of one of said at least two circular saw blades can be received by said at least one circumferential gullet of another of said at least two circular saw blades, said at least two circular saw blades being in a parallel relationship; and,
   b. at least one spacer washer having an axial arbor bore therethrough, said at least one spacer washer being mountable onto said arbor between any two of said at least two circular saw blades to adjust said blades for a desired dado cutting width.

4. A cooperating cam assembly for sequentially spacing items, the cam assembly comprising:
   a. a left cam, said left cam having a left face and a right face, said right face having a center point, said left cam having an axis line, said axis line passing through said center point and being transverse to said right face, said right face having two semicircular-shaped cam segments, said two semicircular-shaped cam segments being concentric about said center point, each of said cam segments having a low point and a high point with a linear rise from said low point to said high point, said low point of one of said two semicircular-shaped cam segments abutting said high point of the other of said two semicircular-shaped cam segments, said two semicircular-shaped cam segments being an identical transverse distance from said right face on any line connecting said two semicircular-shaped cam segments and passing through said axis, each of said two semicircular-shaped cam segments having a pin extending therefrom, said pins being on a line connecting said pins and passing through said axis, said pins being parallel to said axis and equidistant a first distance therefrom;
   b. a center cam, said center cam having a left face and a right face, said left face having a center point, said right face having a center point, said center cam having an axis line, said axis line passing through said left face center point and said right face center point, said axis line being transverse to said left face and said right face;
   said left face having two semicircular-shaped cam segments, said two semicircular-shaped cam segments being concentric about said left face center point, each of said cam segments having a low point and a high point with a linear rise from said low point to said high point, said low point of one of said two semicircular-shaped cam segments abutting said high point of the other of said two semicircular-shaped cam segments, said two semicircular-shaped cam segments being an identical transverse distance from said left face on any line connecting said two semicircular-shaped cam segments and passing through said axis, each of said two semicircular-shaped cam segments having a groove extending partway thereround, said grooves being said first distance from said axis;

said right face having two semicircular-shaped cam segments, said two semicircular-shaped cam segments being concentric about said right face center point, each of said cam segments having a low point and a high point with a linear rise from said low point to said high point, said low point of one of said two semicircular-shaped cam segments abutting said high point of the other of said two semicircular-shaped cam segments, said two semicircular-shaped cam segments being an identical transverse distance from said right face on any line connecting said two semicircular-shaped cam segments and passing through said axis, each of said two semicircular-shaped cam segments having a groove extending partway thereround, said grooves being said first distance from said axis;

c. a right cam, said right cam having a left face and a right face, said right face having means to adjust said cam assembly, said left face having a center point, said right cam having an axis line, said axis line passing through said center point and being transverse to said left face, said left face having two semicircular-shaped cam segments, said two semicircular-shaped cam segments being concentric about said center point, each of said cam segments having a low point and a high point with a linear rise from said low point to said high point, said low point of one of said two semicircular-shaped cam segments abutting said high point of the other of said two semicircular-shaped cam segments, said two semicircular-shaped cam segments being an identical transverse distance from said left face on any line connecting said two semicircular-shaped cam segments and passing through said axis, each of said two semicircular-shaped cam segments having a pin extending therefrom, said pins being on a line connecting said pins and passing through said axis, said pins being parallel to said axis and equidistant said first distance therefrom;

where said left cam right face semicircular-shaped cam segments abut said center cam left face semicircular-shaped cam segments with said pins in said left cam right face semicircular-shaped cam segments fit into said grooves in said center cam left face semicircular-shaped cam segments; where said right cam left face semicircular-shaped cam segments abut said center cam right face semicircular-shaped cam segments with said pins in said right cam left face semicircular-shaped cam segments fit into said grooves in said center cam right face semicircular-shaped cam segments; said left cam right face, said center cam left face, said center cam right face, and said right cam left face being in a parallel alignment; said left cam axis line, said center cam axis line, and said right cam axis line being coincident; and, whereby, to sequentially adjust said cam assembly, said means to adjust said cam assembly is rotated causing said right cam right face to move in a direction away from said center cam and said left cam until said pins in said right cam left face semicircular-shaped cam segments in said grooves in said center cam right face semicircular-shaped cam segments hit a first limit point, at which time, continued rotation of said means to adjust said cam assembly causes said right cam right face and said center cam left face and said center cam right face to move in a direction away from said left cam until said pins in said left cam right face semicircular-shaped cam segments in said grooves in said center cam left face semicircular-shaped cam segments hit a second limit point, at which time, continued rotation of said means to adjust said cam assembly causes said left cam, said center cam, and said right cam to move together.

5. The adjustable dado cutter of claim 1, where said at least two circular saw blades comprises a left blade and a right blade and where said cam assembly comprises a left cam, a right cam, and a right cam retaining ring; said left cam and said right cam having axial arbor bores therethrough; said left cam being attached to said left blade and in a coaxial alignment therewith; said right cam retaining ring attached to said right blade thereby rotatably securing said right cam to said right blade and in a coaxial alignment therewith, said right cam including means to adjust dado cutting width from a minimum cutting width to a maximum cutting width; said left cam and said right cam being in a coaxial alignment.

6. The adjustable dado cutter of claim 1, where said at least two circular saw blades comprises a left blade, a center blade, and a right blade and where said cam assembly comprises a left cam, a center cam, a right cam, and a right cam retaining ring; said left cam, said center cam, and said right cam having axial arbor bores therethrough; said left cam being attached to said left blade and in a coaxial alignment therewith; said center cam being rotatable attached to said center blade and in a coaxial alignment therewith; said right cam retaining ring attached to said right blade thereby rotatably securing said right cam to said right blade and in a coaxial alignment therewith, said right cam including means to adjust dado cutting width from a minimum cutting width to a maximum cutting width; said left cam, said center cam, and said right cam being in a coaxial alignment.

7. The adjustable dado cutter of claim 5, where said at least one off-set saw tooth of said left blade comprises two diametrically opposed teeth off-set in a right direction, where said at least one planar saw tooth of said left blade cuts a first path and where said two diametrically opposed teeth off-set in a right direction cut a second path, said first path and said second path being adjacent; where said at least one off-set saw tooth of said right blade comprises two diametrically opposed teeth off-set in a left direction, where said two diametrically opposed teeth off-set in a left direction cut a third path and where said at least one planar saw tooth of said right blade cuts a fourth path, said third path and said fourth path being adjacent; and, when said means to adjust dado cutting width is positioned for a minimum cutting width, said second path and said third path overlap.

8. The adjustable dado cutter of claim 6, where said at least one off-set saw tooth of said left blade comprises two diametrically opposed teeth off-set in a right direction, where said at least one planar saw tooth of said left blade cuts a first path and where said two diametrically opposed teeth off-set in a right direction cut a second path, said first path and said second path being adjacent; where said at least one off-set saw tooth of said center blade comprises a first and a second diametrically opposed off-set tooth, said first off-set tooth being off-set in a left direction and said second off-set tooth being off-set in a right direction, where said first off-set tooth cuts a third path, where said at least one planar saw tooth of said center blade cuts a fourth path and where said second off-set tooth cut a fifth path, said third path, said fourth path, and said fifth path being adjacent; where said at least one off-set saw tooth of said right blade comprises two diametrically opposed teeth off-set in a left direction, where said two diametrically opposed teeth off-set in a left direction cut a sixth path and where said at least one planar saw tooth of said right blade cuts a seventh path, said sixth path and said seventh path being adjacent; and, when said means to adjust dado cutting width is positioned for a minimum cutting width, said second path and said third path overlap and said fifth path and said sixth path overlap.

9. The adjustable dado cutter of claim 7, where said at least one planar saw tooth of said left blade includes at least one saw tooth having a flat bevel and at least one scoring saw tooth having a sloping bevel, said bevel sloping in a first direction from left to right; where said left blade two diametrically opposed teeth off-set in a right direction have a flat bevel; where said at least one planar saw tooth of said right blade includes at least one saw tooth having a flat bevel and at least one scoring saw tooth having a sloping bevel, said bevel sloping in a second direction from right to left; and, where said right blade two diametrically opposed teeth off-set in a left direction have a flat bevel.

10. The adjustable dado cutter of claim 8, where said at least one planar saw tooth of said left blade includes at least one saw tooth having a flat bevel and at least one scoring saw tooth having a sloping bevel, said bevel sloping in a first direction from left to right; where said left blade two diametrically opposed teeth off-set in a right direction have a flat bevel; where said center blade first and second diametrically opposed off-set teeth and said at least one planar saw tooth of said center blade have a flat bevel; where said at least one planar saw tooth of said right blade includes at least one saw tooth having a flat bevel and at least one scoring saw tooth having a sloping bevel, said bevel sloping in a second direction from right to left; and, where said right blade two diametrically opposed teeth off-set in a left direction have a flat bevel.

11. The adjustable dado cutter of claim 5:
a. where said left cam has a left face and a right face, said right face having two semicircular-shaped cam segments, said two semicircular-shaped cam segments being concentric about said left cam axial bore, each of said cam segments having a low point and a high point with a linear rise from said low point to said high point, said low point of one of said two semicircular-shaped cam segments abutting said high point of the other of said two semicircular-shaped cam segments, said two semicircular-shaped cam segments being an identical transverse distance from said right face on any diametric line connecting said two semicircular-shaped cam segments, each of said two semicircular-shaped cam segments having a pin extending therefrom, said pins being on a diametric line and being equidistant a first distance from said left cam axial arbor bore;
b. where said right cam has a left face and a right face, said left face having two semicircular-shaped cam segments, said two semicircular-shaped cam segments being concentric about said right cam axial arbor bore, each of said cam segments having a low point and a high point with a linear rise from said low point to said high point, said low point of one of said two semicircular-shaped cam segments abutting said high point of the other of said two semicircular-shaped cam segments, said two semicircular-shaped cam segments being an identical transverse distance from said left face on any diametric line connecting said two semicircular-shaped cam segments, each of said two semicircular-shaped cam segments having a groove extending partway thereround, said grooves being said first distance from said right cam axial arbor bore;
where said left cam right face semicircular-shaped cam segments abut said right cam left face semicircular-shaped cam segments with said pins in said left cam right face semicircular-shaped cam segments fit into said grooves in said right cam left face semicircular-shaped cam segments.

12. The adjustable dado cutter of claim 6:
a. where said left cam has a left face and a right face, said right face having two semicircular-shaped cam segments, said two semicircular-shaped cam segments being concentric about said left cam axial bore, each of said cam segments having a low point and a high point with a linear rise from said low point to said high point, said low point of one of said two semicircular-shaped cam segments abutting said high point of the other of said two semicircular-shaped cam segments, said two semicircular-shaped cam segments being an identical transverse distance from said right face on any diametric line connecting said two semicircular-shaped cam segments, each of said two semicircular-shaped cam segments having a pin extending therefrom, said pins being on a diametric line and being equidistant a first distance from said left cam axial arbor bore;
b. where said center cam having a left face and a right face, said left face having two semicircular-shaped cam segments, said two semicircular-shaped cam segments being concentric about said center cam axial bore, each of said cam segments having a low point and a high point with a linear rise from said low point to said high point, said low point of one of said two semicircular-shaped am segments abutting said high point of the other of said two semicircular-shaped cam segments, said two semicircular-shaped cam segments being an identical transverse distance from said left face on any diametric line, each of said two semicircular-shaped cam segments having a groove extending partway thereround, said grooves being said first distance from said center cam axial arbor bore;
said right face having two semicircular-shaped cam segments, said two semicircular-shaped cam segments being concentric about said center cam axial arbor bore, each of said cam segments having a low point and a high point with a linear rise from said low point to said high point, said low point of one of said two semicircular-shaped cam segments abutting said high point of the other of said two semicircular-shaped cam segments, said two semicircular-shaped cam segments being an identical transverse distance from said right face on any diametric line, each of said two semicircular-shaped cam segments having a groove extending partway thereround, said grooves being said first distance from said center cam axial arbor bore;

c. where said right cam has a left face and a right face, said right face including said means to adjust dado cutting width, said left face having two semicircular-shaped cam segments, said two semicircular-shaped cam segments being concentric about said right cam axial arbor bore, each of said cam segments having a low point and a high point with a linear rise from said low point to said high point, said low point of one of said two semicircular-shaped cam segments abutting said high point of the other of said two semicircular-shaped cam segments, said two semicircular-shaped cam segments being an identical transverse distance from said left face on any diametric line connecting said two semicircular-shaped cam segments, each of said two semicircular-shaped cam segments having a pin extending therefrom, said pins being on a diametric line and being equidistant said first distance from said right cam axial arbor bore;

where said left cam right face semicircular-shaped cam segments abut said center cam left face semicircular-shaped cam segments with said pins in said left cam right face semicircular-shaped cam segments fitting into said grooves in said center cam left face semicircular-shaped cam segments; where said right cam left face semicircular-shaped cam segments abut said center cam right face semicircular-shaped cam segments with said pins in said right cam left face semicircular-shaped cam segments fitting into said grooves in said center cam right face semicircular-shaped cam segments.

* * * * *

UNITED STATES PATENT AND TRADEMARK OFFICE
CERTIFICATE OF CORRECTION

PATENT NO. : 5,309,962
DATED : May 10, 1994
INVENTOR(S) : Wilfred M. McCord, Jr; David T. Brutscher, It is certified that error appears in the above-indentified patent and that said Letters Patent is hereby corrected as shown below:

Column 6, line 45, delete "α " insert --"--

Column 14, line 44, delete "am" insert --cam--

Signed and Sealed this

Eighteenth Day of October, 1994

Attest:

BRUCE LEHMAN

Attesting Officer

Commissioner of Patents and Trademarks